United States Patent [19]
Birkner et al.

[11] Patent Number: 5,168,820
[45] Date of Patent: Dec. 8, 1992

[54] PROCESS FOR THE PRODUCTION OF CLINKERS

[75] Inventors: Friedrich Birkner, Gross Sierning; Wolfgang Schwarz, Vienna, both of Austria

[73] Assignee: Magindag Steirische Magnesit-Industrie Aktiengesellschaft, Vienna, Austria

[21] Appl. No.: 613,674

[22] PCT Filed: May 30, 1990

[86] PCT No.: PCT/AT90/00050
§ 371 Date: Jan. 28, 1991
§ 102(e) Date: Jan. 28, 1991

[87] PCT Pub. No.: WO90/14899
PCT Pub. Date: Dec. 13, 1990

[30] Foreign Application Priority Data

May 31, 1989 [AT] Austria .................. 1321/89

[51] Int. Cl.$^5$ ............................... F23G 7/04
[52] U.S. Cl. ................. 110/346; 110/236; 110/238
[58] Field of Search ........... 110/346, 238, 236, 165 R

[56] References Cited

U.S. PATENT DOCUMENTS 4,583,470  4/1986  Hirose ................... 110/346
5,037,561  8/1991  Copeland ............. 110/346 X

FOREIGN PATENT DOCUMENTS 313016   4/1989   European Pat. Off. .
3630697  3/1987   Fed. Rep. of Germany .
5067280  11/1976  Japan .
52-29471  5/1977  Japan .
55-18229  4/1980  Japan .
55-75779  8/1980  Japan .

OTHER PUBLICATIONS

Chemistry & Industry, No. 7, Apr. 2, 1984, (Letchworth, Herts, GB), J. Dwyer et al.: "Zeolites for Industry", pp. 237-245.

Primary Examiner—Edward G. Favors
Attorney, Agent, or Firm—Nixon & Vanderhye

[57] ABSTRACT

In a process for the production of clinkers from sludges containing heavy metals, especially electroplating sludges, river and/or harbor sludges, in which the sludges are mixed with clay, especially brickyard clay, and optionally lean materials and fluxing materials and then are burned to clinkers especially at temperatures between 750° and 1150° C., zeolites are admixed with the sludges and the clay before the burning.

15 Claims, No Drawings

PROCESS FOR THE PRODUCTION OF CLINKERS

The invention relates to a process for the production of clinkers from sludges containing heavy metals, especially electroplating sludges, river and/or harbor sludges, in which the electroplating are mixed with clay, especially brickyard clay, and optionally lean materials and fluxing materials and then are burned to clinkers especially at temperatures between 750° and 1150° C.

A process of the initially mentioned type can be gathered, for example, from AT-PS 387 766. The previously known process was developed for the disposal of sludges containing heavy metals, as they occur especially in industrial pickling units or electroplating plants and by the binding of the heavy metal compounds or heavy metals in a clinker a product was provided in which the sludges containing heavy metals, too are enclosed in a largely vitrified mass, by which the danger of an elution of water-soluble heavy metal salts was substantially reduced. At the same time, with the clinkers a product was provided which is marked by characteristic dark shades and could be used in the construction industry. The previously known process in this case was performed so that the period of burning of the mixture of clay and sludges containing heavy metals was selected as a function of the desired lower residual porosity, and a residual porosity clearly below 6% was aimed at. The burnt products in this case are largely neutral so that even in acid rain only slight leaching of the heavy metal salts could be observed. At this point, clinkers are substantially distinguished from construction materials whose stability is achieved by hydraulic binding. Gypsum or concrete are therefore unsuitable for safely enclosing sludges containing heavy metals from washing out, since unlike clinkers they are not resistant to chemical attacks, e.g. chloride, sulfate, acid rain, etc. and large amounts of heavy metal salts can be washed out.

For the clinker production pulverized grog or the like is mostly used as lean material and the bricks can be molded in vacuum extruders.

To improve the elution behavior it was already proposed in AT-PS 387 766 to add neutral or acid additives, such as silicon dioxide or an active siliceous earth product, to the brickyard clay. Burning to clinkers leads to a conversion of the heavy metal compounds to oxides of low solubility and the additives proposed at that time were supposed to cause an acceleration of the vitrification. Besides this action accelerating the vitrification, a cation exchange action was already ascribed to such siliceous earth products, since such products are effective as Lewis acids. The additives act, moreover, in such a way that the porosity is reduced and thus washing out of metal was supposed to be made even more difficult.

Depending on the origin of the sludges, it is generally necessary to neutralize acid waters, and heavy metals form precipitates as hydroxides. But the formed hydroxides partially exhibit amphoteric properties and have their solubility maxima at different pH's. This means that at least a part of the heavy metals is present in soluble form. Such water-soluble compounds can be bound only inadequately in clinkers and in the drying process come to the surface of the clinkers with the water. Thus an unwanted concentration of such compounds occurs in the near-surface layers, which subsequently, even if these compounds near the surface are converted to the greatest extent possible into insoluble oxides during burning, increased elution values result for these heavy metals, especially under conditions of an acid rain.

The invention aims at providing a mixture for the production of clinkers, in which, when drying, the danger of a migration of water-soluble heavy metal compounds to the near-surface areas is very largely prevented, and which altogether guarantees a more homogeneous concentration distribution of the heavy metal compounds in the interior of the clinkers, so that the elution properties, especially in conditions of an acid rain, are further improved. To achieve this object the process according to the invention essentially consists in zeolites being admixed with the sludges and the clay before the burning. Since zeolites are admixed with the clay before burning, additives are put in which especially in the alkaline medium show a clearly better adsorption of heavy metals and which, moreover, in the transition to neutral or weakly acid medium show clear ion exchange properties, by which stable bonds with the heavy metal ions are formed. The reduction of the water solubility here leads to clearly less migration and, with an appropriate homogenizing of the mixture, to a consistent distribution of the heavy metals in the end product after the burning process. According to the invention, zeolites are advantageously used with different cation charge, especially zeolites charged with alkaline earths and alkalies, and especially the zeolites charged with calcium or magnesium in the alkaline medium show a clear improvement of the adsorption of the heavy metal compounds and zeolites charged with alkalies make possible an ion exchange in neutral or weak acid medium. Suitable zeolites in this case can be selected from the group of clinoptilolites, ferrionites, phillipsites, mesolites, blaumontites and/or erionites.

To guarantee that even after an alkaline precipitation for the formation of hydroxides, the ion-exchange properties of zeolites in neutral or optionally weak acid medium during burning can be fully used, it has proved particularly advantageous if the process according to the invention is performed so that, in addition to zeolites, active siliceous earth products with BET numbers above 50 $m^2/g$, preferably above 200 $m^2/g$, are used. The addition of such siliceous earth products with high specific surface leads to a clear reduction of the pH and to a buffering close to the neutral point, so that optimal ion-exchange conditions for the zeolites used are provided. At the same time, during such an ion-exchange because of the alkaline earths released from the zeolites, calcium silicate is formed, which serves to reduce the vitrification temperature and noticeably reduces the residual porosity. Here advantageously a serpentine, purified by leaching with hydrochloric acid, with grain diameters of at most 5 mm, preferably 0.01–2 mm, is used as active siliceous earth product.

To secure the most favorable ion-exchange conditions in each case the procedure advantageously is to use the zeolites and siliceous earth products in amount ratios of 10:1 to 1:10, and the amount of zeolites and possibly of siliceous earth products for achieving as extensive a bonding of the heavy metal compounds as possible is advantageously selected so that zeolites and optionally siliceous earth products are used in amount ratios to the dry substance content of the sludges containing heavy metals of 1:100 to 10:1.

To make possible a satisfactory forming of clinkers, for example by extrusion, in case of higher portions of electroplating sludges and correspondingly higher portions of zeolites and siliceous earth products, the procedure advantageously is to add bentonites.

Such bentonites improve the plastic properties and thus the drawing capacity, but the bentonites added at the same time are able to bind toxic organic compounds. Moreover, the bentonites have ion-exchange capabilities so that also by addition of the bentonites a homogenizing of the distribution of the heavy metals in the end product can be achieved.

For precipitation of heavy metal salts, advantageously the sludges before or during the mixing with zeolites are adjusted to a pH of 7.5 to 9.5. To achieve a medium suitable for ion-exchange of zeolites, here preferably siliceous earth products are added in an amount, which causes a reduction of the pH to 6 to 8, especially to a large extent a neutralization.

The combustion waste gases occurring in the burning of the clinkers can contain volatile heavy metal compounds, especially cadmium, mercury, lead or zinc compounds, and it is especially within the framework of the invention to proceed so that the exhaust gases from the process of burning the clinkers are filtered over zeolites and that the used filter material is added to the sludges as additive by which it is assured that even the used filter material can be disposed of within the process.

The invention is explained below in greater detail by adsorption tests:

A first test series was performed as a screening test for the maximum heavy metal absorption and adsorption. For the performance of the test 10 g of a natural zeolite (Z1), charged with sodium and potassium ions, was once suspended in 1000 ml of an 0.05M heavy metal nitrate solution at a pH of 5.8. And in a second test 10 g of a natural zeolite, charged with calcium and magnesium ions, was suspended in the identical heavy metal nitrate solution. Before addition of the respective zeolites, the heavy metal nitrate solution contained 3.3 ppm of zinc ions, 10.4 ppm of lead ions, 2.9 ppm of nickel ions, 2.6 ppm of chromium ions, 5.6 ppm of cadmium ions and 3.2 ppm of copper ions. A third such heavy metal nitrate solution as reference solution was filtered through a glass filter with pore size of 16 to 30 microns and this solution exhibited the following composition after 30 minutes:

| Metal | Ref |
|-------|-----|
| Zn | 0,68 ppm |
| Pb | 7,83 ppm |
| Ni | 2,80 ppm |
| Cr | 1,18 ppm |
| Cd | 4,77 ppm |
| Cu | 2,84 ppm |

In contrast, the solution, in which zeolite (Z1) was suspended, after 30 minutes contained only 0.01 ppm of zinc, which relative to the reference solution corresponds to a 99% improved adsorption, 0.01 ppm of lead ions, which relative to the reference solution corresponds to a 99.9% improved adsorption, 0.02 ppm of nickel ions (99% improved adsorption), 0.01 ppm of chromium ions (99% improved adsorption), 0.79 ppm of cadmium ions, which relative to the reference solution corresponds to an 83% improved adsorption and 0.03 ppm of copper ions, which relative to the reference solution corresponds to a 98.9% improved adsorption. The determination of adsorption was performed with inductively coupled plasma emission (ICP). The determination of lead, cadmium and copper contents of this solution was also performed polarographically for comparison purposes and it was found that 99% of the lead ions was adsorbed, 79% of the cadmium ions was absorbed and 94% of the copper ions was adsorbed. Also a new polarographic measurement after 24 hours produced no substantial change of these values.

In the case of the zeolite (Z2), charged with calcium and magnesium ions, of the treated solution, after 30 minutes there were found 0.01 ppm of lead ions, which relative to the reference solution corresponds to a 99% improved adsorption, 1.0 ppm of cadmium ions, which relative to the reference solution corresponds to a 39% improved adsorption, and 0.11 ppm of copper ions, which relative to the reference solution corresponds to a 93% improved adsorption. The indicated values were polarographically determined. A new measurement of the adsorption of zeolite (Z2) was performed after 24 hours and the following values were found:

| Metal | Z2 | % Improvement of Adsorption |
|-------|-----|------|
| Zn | 0,028 ppm | 95,9% |
| Pb | <0,1 ppm | >98,7% |
| Ni | 1,67 ppm | 40,3% |
| Cr | 0,04 ppm | 97,0% |
| Cd | 2,75 ppm | 42,1% |
| Cu | 0,03 ppm | 98,9% |

These adsorption analyses were performed only with ICP. It turns out that the best adsorption values could be obtained with zeolite (Z1) but that also at the indicated pH even with zeolite (Z2) significantly better adsorption values than with usual filter processes could be obtained.

Also to be able to examine the heavy metal adsorption in alkaline medium, after 24 hours both the reference solution and the two suspensions were made alkaline by addition of sodium hydroxide solution (pH=9) and were stirred for another 24 hours. After this 24 hours, a new adsorption test was performed. The reference solution, at this pH and new filtration through a glass filter with pore size of 16 to 30 microns, had the following composition:

| Metal | Reference |
|-------|-----------|
| Zn | <0,01 ppm |
| Pb | <0,10 ppm |
| Ni | 0,42 ppm |
| Cr | <0,01 ppm |
| Cd | 1,49 ppm |
| Cu | <0,02 ppm |

Relative to the reference solution, the solution, treated with zeolite Z1, contained 0.93 ppm of cadmium ions, which relative to the reference solution corresponds to a 52% improved adsorption. This analysis was again performed with ICP. After 24 more hours stirring, the adsorption of the solution, treated with zeolite Z1, was again determined polarographically. After this period, 0.5 ppm of nickel ions was found in the solution, which means no improvement whatsoever in comparison with the reference solution. Further, 1.38 ppm of cadmium ions was found, which means only a 7% improved adsorption in comparison with the reference solution. Thus it is shown that under alkaline conditions, zeolite Z1 shows no substantial improvement in comparison with a conventional working up of heavy metal nitrate solutions.

The solution, treated with zeolite Z2, exhibited in an analysis with ICP 0.02 ppm of nickel ions, which corresponds to a 95% improved adsorption in comparison with the reference solution. The adsorption of the cadmium ions was improved 98% in comparison with the reference solution and only 0.03 ppm of cadmium ions was found.

After another 24 hours, this measurement was repeated and as before only 0.02 ppm of nickel ions could be found in the solution. The measurement of the cadmium ions produced 0.07 ppm, which still corresponds to a 95% improved adsorption in comparison with the reference solution.

To sum up it can be said that especially zeolite Z2 in the alkaline medium shows a significantly improved adsorption in comparison with the reference solution and that with zeolite Z1 at least an equally good adsorption can be achieved.

In a second test series the selectivity of chemically activated zeolites was determined. As reference substance here an unactivated zeolite, which is charged with sodium ions and potassium ions (Z1), was used. In this test, 2 g each of zeolite Z1 and of the zeolite (Z2), charged with calcium and magnesium, was suspended in 100 ml each of a 0.2M heavy metal solution and stirred with a magnetic stirrer at average speed. The pH of the solution was 5. The adsorption of the zeolites was determined after 24 hours by adsorption measurements with ICP and led to the following results:

| Metal | Initial solution | Z1 Ref. | Z1 Act. | Z2 Act. |
| --- | --- | --- | --- | --- |
| Zn | 5.95 ppm | | | |
| Pb | 39.74 ppm | 15 ppm (62%) | 1.8 ppm (96%) | 1.8 ppm (96%) |
| Ni | 11.03 ppm | | | |
| Cr | 10.08 ppm | 10 ppm (0%) | 8.3 ppm (18%) | 8.4 ppm (17%) |
| Cd | 18.71 ppm | 18 ppm (4%) | 16 ppm (15%) | 15 ppm (20%) |
| Cu | 15.31 ppm | 14 ppm (10%) | 12.2 ppm (20%) | 10 ppm (35%) |

In this adsorption test it was shown that especially activated zeolite Z2, in comparison with unactivated zeolite Z1, exhibits clearly improved adsorption capability. Also the activated zeolite Z1 shows an improved activity in comparison with the unactivated zeolite Z1, which was used as reference solution. But the improvement is not comparable with that of the activated zeolite Z2.

In summary it can be stated that by use of zeolites charged with alkalies or alkaline earths a substantial adsorption of heavy metal ions from heavy metal nitrate solutions both in the weak acid and in the slightly alkaline medium is almost completely successful.

We claim:

1. A process for the production of clinkers from sludge containing heavy metals, comprising the steps of:
   (i) mixing the sludge containing heavy metals with clay, lean materials, fluxing materials and zeolites, having different cation charges than the heavy metals, to form a mixture; and
   (ii) burning the mixture at a temperature between 750° to 1150° C. to form clinkers.

2. Process according to claim 1, wherein the zeolites are used with different cation charge, especially zeolites charged with alkaline earths and alkalies.

3. Process according to claim 1, wherein in addition to zeolites, active siliceous earth products with BET numbers above 50 m$^2$/g, preferably above 200 m$^2$/g, are used.

4. Process according to one of claim 3, wherein a serpentine, purified by leaching with hydrochloric acid, with grain diameter of at most 5 mm, preferably 0.01–2 mm, is used as active siliceous earth product.

5. Process according to one of claim 3, wherein the zeolites and siliceous earth products are used in amount ratios of 10:1 to 1:10.

6. Process according to claim 1, wherein zeolites and optionally siliceous earth products are used in amount ratios to the dry substance content of the sludges containing heavy metals of 1:100 to 10:1.

7. Process according to claim 1, wherein bentonites are added.

8. Process according to claim 1, wherein the sludges before or during the mixing with zeolites are adjusted to a pH of 7.5 to 9.5.

9. Process according to claim 1, wherein the exhaust gases from the process of burning the clinkers are filtered over zeolites and wherein the used filter material is added to the sludges as additive.

10. A process according to claim 1 wherein the sludge is selected from the group consisting of electroplating sludges, river and harbor sludges, and combinations of electroplating, river and harbor sludges.

11. A process according to claim 1 wherein the clay is brickyard clay.

12. A process according to claim 1 wherein the lean material is pulverized grog.

13. A process according to claim 8 wherein the pH of the sludge is further reduced to a pH range between 6 to 8 by adding siliceous earth products.

14. A process according to claim 1 wherein the zeolites are selected from the group consisting of clinoptilolites, ferrionites, phillipsites, mesolites, blaumontites, erionites, and combinations thereof.

15. A process for the production of clinkers from sludge containing heavy metals, having improved elution properties, comprising the steps of:
   (i) mixing the sludge with clay, lean materials, zeolites, having different cation charges than the heavy metals, and fluxing materials to form a mixture;
   (ii) burning the mixture at a temperature between 750° to 1150° C. to form clinkers;
   (iii) filtering waste gases produced by the burning with zeolites;
   (iv) using used filtering zeolites from step (iii) in the mixing step (i); and
   (v) drying the mixture to form a clinker in which the heavy metals are distributed evenly throughout the clinker.

* * * * *